(12) United States Patent
Kobayashi

(10) Patent No.: US 7,456,523 B2
(45) Date of Patent: Nov. 25, 2008

(54) POWER GENERATION SYSTEM, AND ADMINISTRATION APPARATUS AND ADMINISTRATION METHOD OF POWER GENERATION SYSTEM

(75) Inventor: Takuma Kobayashi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 11/084,044

(22) Filed: Mar. 21, 2005

(65) Prior Publication Data

US 2005/0213272 A1 Sep. 29, 2005

(30) Foreign Application Priority Data

Mar. 23, 2004 (JP) ............... 2004-085237

(51) Int. Cl.
*H02J 3/00* (2006.01)
(52) U.S. Cl. .......................................... 307/82
(58) Field of Classification Search .................. 307/82; 710/240
See application file for complete search history.

(56) References Cited

U.S. PATENT DOCUMENTS

| | | | | |
|---|---|---|---|---|
| 6,141,170 | A | 10/2000 | Hatae et al. ................ | 360/72.1 |
| 6,285,572 | B1 | 9/2001 | Onizuka et al. | |
| 6,396,170 | B1 * | 5/2002 | Laufenberg et al. ........... | 307/64 |
| 6,522,030 | B1 * | 2/2003 | Wall et al. ...................... | 307/43 |
| 7,000,049 | B1 * | 2/2006 | Heitkamp .................... | 710/240 |
| 2004/0117676 | A1 | 6/2004 | Kobayashi et al. .......... | 713/300 |

FOREIGN PATENT DOCUMENTS

| | | |
|---|---|---|
| EP | 0 947 905 | 10/1999 |
| EP | 1 047 179 | 10/2000 |
| JP | 2000-270482 | 9/2000 |
| JP | 2000-305634 A | 11/2000 |

OTHER PUBLICATIONS

S. Luo, et al., "A Classification and Evaluation of Paralleling Methods for Power Supply Modules", Power Electronics Specialists Conference, Jun. 27, 1999, pp. 901-908.

(Continued)

*Primary Examiner*—Michael J Sherry
*Assistant Examiner*—Michael Rutland Wallis
(74) *Attorney, Agent, or Firm*—Fitzpatrick, Cella, Harper & Scinto

(57) ABSTRACT

In a power generation system which includes a plurality of sets of direct current power sources and power converters which are connected to the direct current power sources to convert a direct current power into an alternating current power, the power converters being connected in parallel to supply the alternating current power to a system power supply, from the plurality of power converters in the system, one power converter is set as a master machine which detects an islanding operation state in which power supply from the system power supply is stopped, and setting is executed so as to cause the remaining power converters not to detect the islanding operation state. When the master machine is not present among the power converters in operation, the master machine is selected from the power converters in operation in accordance with a predetermined condition.

10 Claims, 7 Drawing Sheets

OTHER PUBLICATIONS

T.F. Wu, et al., "Reliability Improvement In Parallel Connected Converter Systems", Proceedings of the International Conference on Industrial Electronics, Control and Instrumentation, Oct. 28, 1991, vol. 1, Conf. 17, pp. 429-434.

K. Kurokawa, et al., "Conceptual Considerations on PV Systems Composed of AC Modules", Solar Energy Materials and Solar Cells, Oct. 1997, pp. 243-250.

Japanese Office Action, dated Aug. 8, 2008, in correspondence with JP 2004-085237.

* cited by examiner

FIG. 4

| TERMINAL NUMBER | TERMINAL NAME |
|---|---|
| 1 | DATA COMMUNICATION TERMINAL |
| 2 | ADDRESS COMMUNICATION TERMINAL |
| 3 | SIGNAL GND |
| 4 | DATA TRANSMISSION REQUEST TERMINAL |
| 5 | DATA TRANSMISSION PERMISSION TERMINAL |
| 6 | FRAME GROUND |
| 7 | MASTER MACHINE SETTING TERMINAL |
| 8 | RESERVE MASTER MACHINE SETTING TERMINAL |
| 9 | ALL INVERTER STOP TERMINAL |

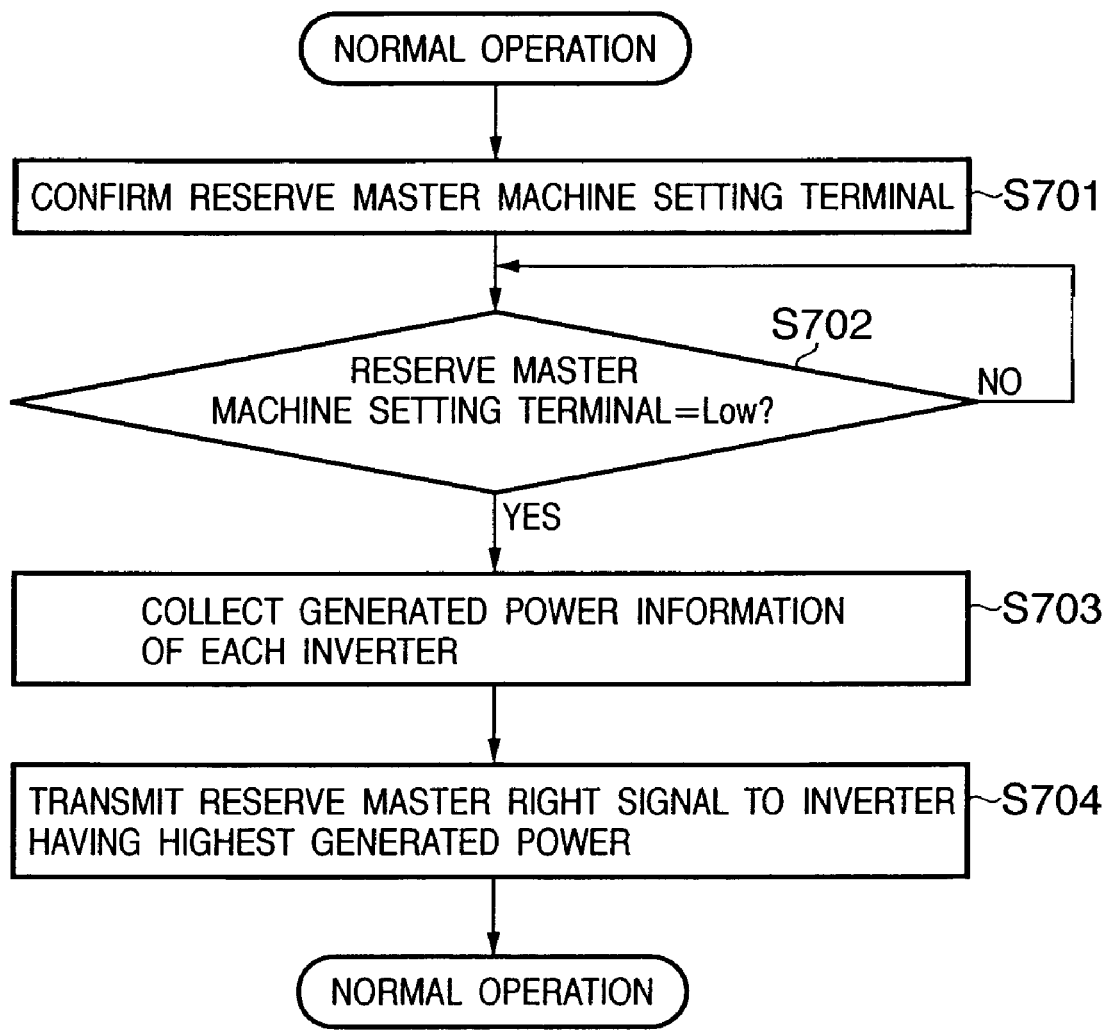

POWER GENERATION SYSTEM, AND ADMINISTRATION APPARATUS AND ADMINISTRATION METHOD OF POWER GENERATION SYSTEM

FIELD OF THE INVENTION

The present invention relates to a power generation system, administration apparatus, administration method of the power generation system and, more particularly, to state administration of a power converter in a power generation system which includes a plurality of sets of direct current power sources and power converters which are connected to the direct current power sources to convert a direct current power into an alternating current power and in which the power converters are connected in parallel to supply the alternating current power to a system power supply.

BACKGROUND OF THE INVENTION

In recent years, since problems of global warming, which has occurred due to carbon dioxide emission by use of fossil fuels and radioactive waste and contamination by nuclear power plant accidents have become serious, interest in the global environment and energy production are growing. Under these circumstances, solar power generation that uses solar light as an inexhaustible and clean energy source, geothermal power generation using geothermal energy, wind power generation using wind power, and the like have been put into practice all over the world.

Solar power generation using solar batteries employs various forms corresponding to output scales ranging from several watts (W) to several thousand kilowatts (kW). A representative system using a solar battery is a solar power generation system which collects a direct current power generated by a solar battery array including a plurality of solar battery modules connected in series and in parallel. The direct current power is converted (DC-AC-converted) into an alternating current power by a power converter such as an inverter and supplied to the loads of subscriber's houses or a commercial alternating current power grid (to also be simply referred to as a "power grid" hereinafter).

An inverter used in such a solar power generation system normally has a capacity of 3 to 5 kW and is mainly attached to the outer wall or entrance of a house. Assume that the capacity of the solar battery array is large, or a plurality of solar battery arrays are installed at different locations. For example, assume that a 3-kW solar battery array is installed on the south side of the roof of a house, and another solar battery array having the same capacity is installed on the north side. In such a case, a plurality of inverters connected in parallel are used.

In recent years, inverter-integrated solar battery modules (also called AC modules) have been developed in which each solar battery module has an inverter with a corresponding capacity (about 100 W) and outputs an alternating current power. In the future, a solar power generation system is expected to be built by using a solar battery array which includes several tens of AC modules connected in parallel. Even in this arrangement, the inverters are connected in parallel.

Generally, in the system coordination operation executed by connecting a power generation system such as a solar power generation system using natural energy to an existing power system, when a power outage occurs in the power system due to an accident or the like, any islanding operation (islanding operation state) of the inverter must be avoided. For this purpose, this state must quickly be detected on the power generation system side, and the operation of the power generation system must be stopped.

To do this, two schemata, i.e., a passive schema and active schema can be used. In the passive schema, the electrical parameters of the system are monitored in the inverter, and the islanding operation state is detected on the basis of a change in parameter values in case of power outage. In the active schema, a variation (disturbance signal) is always given to the voltage or frequency of the output from the inverter, and the islanding operation state is detected by detecting an inverter output variation which is conspicuous in case of power outage.

However, when a number of inverters having the same active detection schema are connected in parallel and execute the system coordination operation, the disturbance signals cause mutual interference. For this reason, the islanding operation detection sensitivity may decrease, and it may become impossible to detect the islanding operation state.

To solve this problem, in Japanese Patent Laid-Open No. 2000-270482, a master/slave selector switch is arranged in each of power conditioners connected in parallel. In the example described in this reference, this switch is operated upon installing the inverters to determine whether to use each inverter as a master machine or slave machine. The islanding operation detection schema is executed by only the master machine. With this arrangement, any decrease in islanding operation detection sensitivity is prevented.

However, the above-described method has the following problems.

When the master machine is set by the switch in advance, and a failure occurs in the master machine, the inverter set as the master machine is not activated so the control to be executed by the master machine cannot be executed. That is, the islanding operation detection function does not operate, and safety suffers.

In the system using AC modules in which one inverter is connected for each solar battery module, when a solar battery module malfunctions or is shaded, the inverter is often not activated, although this problem is rarely posed in a system in which one inverter is connected to every capacity (3 to 5 kW) of the solar battery.

When a number of inverters are connected in parallel, as in the system using AC modules, even when a failure occurs in one inverter, the failure can hardly be recognized. If a failure occurs in the master machine, the operation is continued without executing islanding operation detection for a long time.

Such problems are not limited to solar power generation systems and are common to power generation systems using any other direct current power sources.

SUMMARY OF THE INVENTION

It is an object of the present invention to provide a reliable power generation system which includes a plurality of sets of direct current power sources and power converters which are connected to the direct current power sources to convert a direct current power into an alternating current power and in which the power converters are connected in parallel to supply the alternating current power to a system power supply.

It is another object of the present invention to provide an administration apparatus capable of increasing the reliability of the above-described power generation system.

It is still another object of the present invention to provide an administration method capable of increasing the reliability of the above-described power generation system.

In order to achieve the above objects, a power generation system according to an aspect of the present invention is a power generation system which includes a plurality of sets of direct current power sources and power converters which are connected to the direct current power sources to convert a direct current power into an alternating current power, the power converters being connected in parallel to supply the alternating current power to a system power supply, the system comprising: operation state setting means for setting, from the power converters, one power converter as a master machine which detects an islanding operation state in which power supply from the system power supply is stopped, and executing setting so as to cause the remaining power converters not to detect the islanding operation state, wherein when the master machine is not present among the power converters in operation, the operation state setting means selects the master machine from the power converters in operation in accordance with a predetermined condition.

According to the present invention, in a power generation system which includes a plurality of sets of direct current power sources and power converters which are connected to the direct current power sources to convert a direct current power into an alternating current power, the power converters being connected in parallel to supply the alternating current power to a system power supply, from the plurality of power converters in the system, one power converter is set as a master machine which detects an islanding operation state in which power supply from the system power supply is stopped, and setting is executed so as to cause the remaining power converters not to detect the islanding operation state, and when the master machine is not present among the power converters in operation, the master machine is selected from the power converters in operation in accordance with a predetermined condition.

In this arrangement, only the master machine selected from the plurality of power converters in the system detects the islanding operation. The remaining power converters do not detect the islanding operation. Hence, the islanding operation is efficiently detected. When the master machine is not present among the power converters in operation, a master machine is set from the power converters in operation in accordance with a predetermined condition. A state in which the islanding operation state is not detected in the system can be avoided, and a stable power generation system can be provided.

Each power converter may comprise communication means, and the power converter set as the master machine may transmit a predetermined signal representing that the power converter is set as the master machine to the remaining power converters by using the communication means.

Each power converter may comprise the operation state setting means, and at least one of the power converters except the master machine may monitor a state of the master machine.

The predetermined condition may be one of an order of start of operation and a magnitude of an output power The operation state setting means may set in advance a reserve master machine which operates as the master machine when the master machine stops the operation.

In this case, each power converter may comprise the operation state setting means, and the master machine and reserve master machine monitor each other's states.

The power converters may have at least two operation modes including a maximum power control operation mode and a constant voltage operation mode, and the operation state setting means may set the power converter operating as the master machine when the master machine switches from the maximum power control operation mode to the constant voltage operation mode.

The detection of the islanding operation state may be done by an active schema.

The direct current power source may include a solar battery.

The above-described objects are also achieved by an administration apparatus corresponding to the operation state setting means of the above-described power generation system, an administration method of the power generation system, a computer program which implements the administration method by a computer apparatus, and a storage medium which stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view for explaining the communication terminals of an inverter used in the second embodiment of the present invention;

FIG. 7 is a flowchart for explaining the operation of a master machine according to the second embodiment of the present invention.

DETAILED DESCRIPTION OF THE PREFERRED EMBODIMENTS

Preferred embodiments of the present invention will now be described in detail in accordance with the accompanying drawings. Note that each element in the following embodiments is not intended to limit the scope of the invention, but is described only as an example.

First Embodiment

A power generation system according to the first embodiment of the present invention will be described below with reference to the accompanying drawings. The power generation system will be described below by using an example of a solar power generation system which uses a solar battery module as a power generation system. Not only the solar battery module but also any other means such as a fuel cell or storage battery capable of supplying a direct current power can be used for the power generation system of the present invention.

(Solar Power Generation System)

Figure 3:
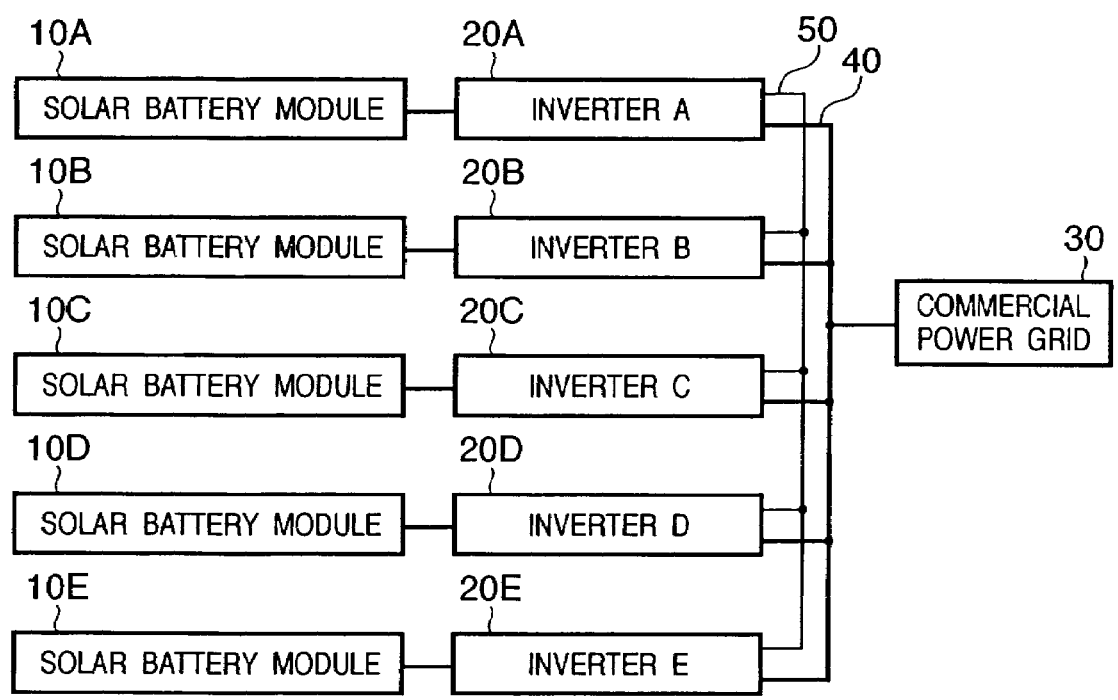
FIG. 3 is a block diagram showing the schematic arrangement of a power generation system used in the first embodiment of the present invention.

FIG. 3 is a block diagram showing the overall arrangement of the solar power generation system of this embodiment. In this embodiment, five solar battery modules 10A to 10E are used as power generation systems. An AC module arrangement is used in which one inverter (power converter) 20 is connected to one solar battery module. The alternating current outputs from five inverters 20A to 20E are connected in parallel by a power line 40, as shown in FIG. 3, and connected to a commercial power grid 30. The inverters 20A to 20E are connected by a communication line 50 and communicate with each other, thereby setting one master machine and four slave machines. Only the master machine executes the islanding operation detection operation.

In installing the solar power generation system of this embodiment, no inverter is set as the master machine in advance.

(Power Generation System)

As the power generation system in the power generation system according to the present invention, solar battery modules SR-04 (Voc=24 V, Isc=5.6 A, Vpm=17 V, Ipm=4.6 A, and Pm=77 W) available from Canon are used, each which is manufactured by connecting 12 amorphous silicon solar batteries (output: 6.4 W) in series.

Voc is the open-circuit voltage measured under standard test conditions (spectrum AM: 1.5, intensity: 1 kW/m$^2$, and solar battery temperature: 25° C.; to be referred to as STC hereinafter), Isc is the short-circuit current measured under STC, Pm is the maximum power measured under STC, Vpm is the optimum operating voltage, i.e., operating voltage when the output power is Pm, and Ipm is the optimum operating current, i.e., operating current when the output power is Pm. They are defined by JIS (Japanese Industrial Standard) C8680.

The solar battery module usable in the power generation system of the present invention is not limited to the amorphous silicon solar battery. Any other solar battery module formed by using crystal silicon or a compound semiconductor such as $CuInSe_2$ can be used.

(Internal Structure of Power Converter)

Figure 2:
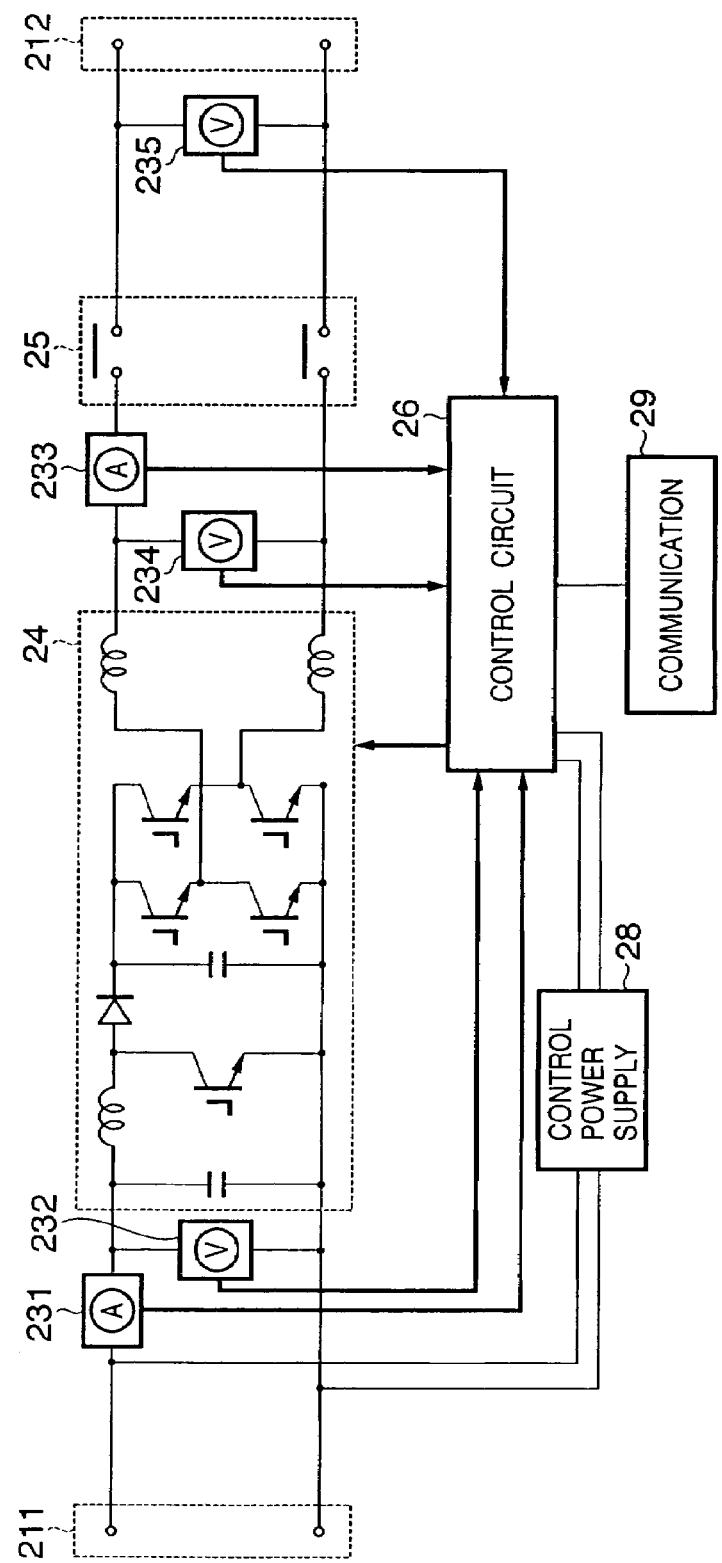
FIG. 2 is a block diagram showing the arrangement of the inverter used in the first embodiment of the present invention.

FIG. 2 is a block diagram showing the internal structure of the inverter 20 used in this embodiment. An input terminal 211 receives a direct current power output from a solar battery module 10 described above. An output terminal 212 outputs the power converted into an alternating current power to a system or alternating current load. A DC-AC conversion circuit 24 includes a smoothing capacitor, reactor, diode, and switching elements. An interactive relay 25 turns on/off the alternating current output. An input voltage detector 232 detects the voltage input from the input terminal. An input current detector 231 detects the input current. An output voltage detector 234 detects the voltage which is DC-AC-converted by the DC-AC conversion circuit and to be output. An output current detector 233 detects the current to be output. A system voltage detector 235 detects the voltage of the power grid 30 connected to the output terminal. A control circuit 26 includes a microprocessor and the like.

The control circuit 26 executes control (maximum power tracking control) to extract the maximum power from the solar battery array in accordance with the value of the voltage or current detected by the direct current voltage detector 232 or alternating current detector 231, control of the switching elements of the DC-AC conversion circuit, and coordination protection such as OV (Over Voltage), OF (Over Frequency), and islanding operation detection. A control power supply generation circuit 28 converts the output power from the solar battery module input from the input terminal into a predetermined voltage and supplies it as the control power supply to operate the control circuit.

(Control Circuit)

As the control circuit 26, a one-chip microcomputer is used. This microcomputer is formed by mounting the functions of a CPU, memory, A/D converter, 16-bit timer, and I/O ports in one chip. When external components such as a quartz oscillator and capacitor are connected, various kinds of control necessary for controlling the power converter can be executed.

The control circuit 26 of this embodiment has two communication terminals 29 to mutually communicate with the plurality of inverters connected in parallel in the system. A master machine setting terminal is assigned as a terminal to set, of the plurality of inverters, a master machine for islanding operation detection, and a GND terminal is set as the GROUND of a signal. The master machine setting terminal is connected to a predetermined I/O port of the microcomputer. After the microcomputer is powered on, the master machine setting terminal is set as a read terminal by the initial setting operation of the program incorporated in the microcomputer. The GND terminal is connected to the digital signal GROUND terminal of the microcomputer.

A form which uses a one-chip microcomputer as the control circuit 26 has been described above. Not only the form using the one-chip microcomputer but a circuit which combines discrete components, IC, and passive components can also be used.

(Inverter Operation)

The operation of the inverter will be described next. At night without the sun, the solar batteries generate no power. Hence, all inverters are inactive. In this case, no master machine is set yet. When the sun rises at dawn, the solar battery modules are irradiated with sunlight, and output voltages from them rise. When the output voltage from a solar battery module reaches a predetermined value, the control power supply of the inverter connected to the solar battery module is turned on.

The subsequent operation will be described with reference to the flowchart shown in FIG. 1. When the control power supply is turned on, the microcomputer of the control circuit 26 is activated. The microcomputer reads out the program stored in advance in the ROM and executes initial setting. In this initial setting operation, the master machine setting terminal is set as the read terminal, as described above. After that, the output voltage from each solar battery module is monitored. The standby state is set until the output voltage exceeds the operation start voltage (activation voltage) of the inverter (step S101).

When the output voltage from the solar battery module exceeds the activation voltage, it is confirmed first whether the state of the master machine setting terminal is Low (step S103). When no inverter is set as the master machine, all master machine setting terminals are Low. When the master machine setting terminal is Low, the inverter sets the I/O terminal of the connected microcomputer as a write terminal (step S104) and sets the output of the master machine setting terminal to High (step S105).

As a result, only the inverter (to be referred to as an "inverter A" hereinafter) whose solar battery module has reached the operation start voltage at the earliest timing is set as the master machine. Once the master machine is set, the master machine setting terminal is always kept at High. Since the master machine setting terminal is already set to High, the remaining inverters connected can recognize that another inverter is set as the master machine.

The inverter A sets the master flag to 1 in the control program (step S106) to set itself as the master machine which executes the islanding operation detection active schema and starts the inverter operation.

The inverter (to be referred to as an "inverter B" hereinafter) which is activated next confirms the state of the master machine setting terminal (step S102) when it is determined in step S101 that the output voltage from the solar battery module B connected to the inverter exceeds the activation voltage. In this case, the terminal has already been set to High by the inverter A. Hence, the inverter B which reads the master machine setting terminal receives a High signal and recognizes that another inverter is set as the master machine. After that, the inverter B sets the slave flag to 1 in the control program (step S107) to set itself as a slave machine which does not execute the islanding operation detection active schema and starts the inverter operation.

Even in third and subsequent inverters C to E activated then, the same control as in the inverter B is executed because the inverter A is already set as the master machine.

As described above, in this embodiment, the inverter which is activated first is set as the master machine. The master machine which executes the islanding operation detection active schema is always present in the power generation system. Hence, any state in which the master machine is not operating due to a failure or the like in the system can be avoided, and a safer power generation system can be provided.

Second Embodiment

A power generation system according to the second embodiment of the present invention will be described below. The system of the second embodiment is also a solar power generation system, as in the above-described first embodiment. A description of the same parts as in the first embodiment will be omitted, and characteristic parts of this embodiment will mainly be described.

(Control Circuit)

An inverter according to this embodiment has nine communication terminals, as shown in FIG. 4, to mutually communicate with remaining inverters connected in parallel. Of these communication terminals, the data communication terminal and address communication terminal are connected to the serial communication port of the microcomputer. The data transmission request terminal, data transmission permission terminal, master machine setting terminal, reserve master machine setting terminal, and all inverter stop terminal are connected to the I/O ports of the microcomputer. The signal GND is connected to the I/O ports and the GND terminal of the microcomputer.

After the control power supply of the inverter is powered on, the terminals connected to the I/O ports are set as a read terminal by the initial setting operation of the program incorporated in the microcomputer.

(Inverter Operation)

The operation of the inverter according to this embodiment will be described next with reference to the flowchart shown in FIG. 5.

As in the first embodiment, each inverter stands by until the output voltage from the solar battery module exceeds the activation voltage (step S501). When the output voltage exceeds the activation voltage, the state of the master machine setting terminal is confirmed (step S502). When the master machine setting terminal is Low (YES in step S503), the inverter obtains the master right. The inverter sets the I/O terminal of the connected microcomputer as a write terminal (step S504) and sets the output of the master machine setting terminal to High (step S505). With this operation, the inverter (to be referred to as an "inverter A" hereinafter) which is activated first is set as the master machine.

From this point, the master machine setting terminal is kept at High. When the solar battery modules of the remaining inverters connected reach the operation start voltage, and the states of the master machine setting terminals are confirmed, they are already High. Hence, the inverters can recognize that another inverter is already set as the master machine.

The inverter A set as the master machine sets the master flag to 1 in the program (step S506) to set itself as the master machine which executes the islanding operation detection operation of active schema and starts the inverter operation.

The operation of the inverter (to be referred to as an "inverter B" hereinafter) which is activated next will be described next.

Like the inverter A, the inverter B also confirms the master machine setting terminal when the output voltage from the solar battery module exceeds the activation voltage (steps S501 and S502). In this case, the terminal has already been set to High by the inverter A. Hence, the inverter B which reads the master machine setting terminal receives a High signal (NO in step S503).

Next, the inverter B confirms the reserve master machine setting terminal (step S507). At this time point, no inverter is set as the reserve master machine yet. Hence, the terminal is Low (YES in step S508). When the reserve master machine setting terminal is Low, the inverter B obtains the reserve master right. The inverter sets the I/O terminal of the connected microcomputer as a write terminal (step S509) and sets the output of the reserve master machine setting terminal to High (step S510). The inverter B is set as the reserve master machine.

From this point, the reserve master machine setting terminal is kept at High. When the solar battery modules of the remaining inverters (inverters C to E) connected reach the activation voltage, and reserve master machine setting terminals are read, they are High. Hence, the inverters can recognize that another inverter is already set as the reserve master machine.

The inverter B set as the reserve master machine sets the reserve master flag to 1 in the program (step S511) to set itself as the reserve master machine which executes the islanding operation detection operation of active schema when a failure occurs in the master machine, or the operation of the master machine stops due to shading and starts the inverter operation.

The inverter B transmits the ID number of its own to the master machine through the data communication terminal to notify the master machine that the inverter B is set as the reserve master machine.

The operation of the third inverter (to be referred to as an "inverter C" hereinafter) which is activated next will be described.

Like the remaining inverters, the inverter C also confirms the master machine setting terminal when the output voltage from the solar battery module exceeds the activation voltage (steps S501 and S502). In this case, the terminal has already been set to High by the inverter A. Hence, the inverter C which reads the master machine setting terminal receives a High signal (NO in step S503). Next, the inverter C confirms the reserve master machine setting terminal (step S507). In this case as well, the terminal has already been set to High by the inverter B. Hence, the inverter C which reads the reserve master machine setting terminal receives a High signal (NO in step S508).

As a result, the inverter C can recognize that other inverters are already set as the master machine and reserve master machine. The inverter C is set as a slave machine. The inverter C sets the slave flag to 1 in the program (step S512) to set itself as a slave machine which does not execute the islanding operation detection operation of active schema and starts the inverter operation.

The inverter C transmits the ID number of its own to the master machine and reserve master machine through the data communication line to notify them that the inverter C has started operating as a slave machine.

The operation of the reserve master machine in this embodiment when the master machine (inverter A) has stopped will be described next with reference to the flowchart shown in FIG. 6.

As described above, a High signal is output from the inverter (inverter A) set as the master machine to the master machine setting terminal. In this embodiment, the reserve master machine (inverter B) always monitors the state of the master machine setting terminal and grasps the operation state of the master machine. When the master machine stops, the state of the master machine setting terminal changes from High to Low. Hence, by monitoring the state of the terminal, the reserve master machine can recognize that the master machine has stopped.

The reserve master machine confirms the state of the master machine setting terminal (step S601). Upon confirming that output from the master machine setting terminal is Low (YES in step S602), and the master machine has stopped, the reserve master machine first executes the islanding operation detection operation of active schema as a temporary master machine (step S603) to maintain the safety of the power generation system. Then, the reserve master machine executes an operation of determining a new master machine.

The operation of causing the reserve master machine to determine a new master machine in this embodiment will be described. Each slave machine transmits the ID of its own to the reserve master machine at the start of inverter operation, as described above. For this reason, the reserve master machine knows the inverters currently connected to the power generation system as slave machines.

The reserve master machine sequentially communicates with each inverter connected to the power generation system as a slave machine by using the data communication line, thereby collecting information of the currently generated power of each inverter (step S604). The reserve master machine compares the collected generated energies of the inverters and specifies the inverter having the highest generated power and the inverter having the second highest generated power. The generated power of the reserve master machine itself may also be compared.

The reserve master machine selects the inverter having the highest generated power as the master machine and transmits the master right signal to the inverter selected as the master machine by using the data communication line (step S605). In addition, the reserve master machine selects the inverter having the second highest generated power as the reserve master machine and transmits the reserve master right signal by using the data communication line (step S606).

The inverter selected as the master machine sets the I/O terminal of the microcomputer, which is connected to the master machine setting terminal, as a write terminal and sets the output of the master machine setting terminal to High. Then, the inverter sets the master flag to 1 in the program to set itself as the master machine which executes the islanding operation detection operation of active schema and starts the islanding operation detection operation.

The inverter selected as the reserve master machine sets the I/O terminal of the microcomputer, which is connected to the reserve master machine setting terminal, as a write terminal and sets the output of the reserve master machine setting terminal to High. Then, the inverter sets the reserve master flag to 1 in the program to set itself as the reserve master machine which temporarily executes the islanding operation detection active schema when a failure occurs in the master machine and determines a new master machine and continue the operation.

When the inverter which was set as the reserve master machine does not select itself as either the master machine or reserve master machine, the inverter sets the reserve master machine setting terminal to Low, stops the islanding operation detection operation of active schema (step S607), sets the I/O terminal of the microcomputer, which is connected to the reserve master machine setting terminal, as a read terminal, sets the slave flag to 1 in the program (step S608), and continues the operation as a slave machine which does not execute the islanding operation detection operation (step S609).

The operation of the master machine in this embodiment when the reserve master machine has stopped due to a failure or the like will be described next with reference to the flowchart shown in FIG. 7.

As described above, a High signal is output from the inverter set as the reserve master machine to the reserve master machine setting terminal. In this embodiment, the master machine always monitors the state of the reserve master machine setting terminal and grasps the state of the reserve master machine. When the reserve master machine stops, the state of the reserve master machine setting terminal changes from High to Low. Hence, by monitoring this terminal, the master machine can confirm that the reserve master machine has stopped.

The master machine confirms the state of the reserve master machine setting terminal (step S701). Upon confirming that output from the reserve master machine setting terminal is Low (YES in step S702), and the reserve master machine has stopped, the master machine executes an operation of determining a new reserve master machine.

The operation of causing the master machine to determine a new reserve master machine in this embodiment will be described. Each slave machine transmits the ID of its own to the master machine at the start of inverter operation, as described above. For this reason, the master machine knows the inverters currently connected to the power generation system as slave machines.

The master machine sequentially communicates with each inverter connected to the power generation system as a slave machine by using the data communication line, thereby collecting information of the currently generated power of each inverter (step S703). The master machine compares the collected generated energies of the inverters and specifies an inverter having the highest generated power. The master machine selects the inverter having the highest generated power as the reserve master machine and transmits the reserve master right signal to the inverter selected as the reserve master machine by using the data communication line (step S704).

The inverter selected as the reserve master machine sets the I/O terminal of the microcomputer, which is connected to the reserve master machine setting terminal, as a write terminal and sets the output of the reserve master machine setting terminal to High. Then, the inverter sets the reserve master flag to 1 in the program to set itself as the reserve master machine which temporarily executes the islanding operation detection operation when a failure occurs in the master machine and determines a new master machine and continue the operation.

As described above, in this embodiment, the master machine and reserve master machine monitor each other's states. Even when one of them stops due to a failure or shading, any state in which the islanding operation detection operation is not executed in the power generation system can be avoided, and a safer power generation system can be provided. In addition, since an inverter having the highest generated power, i.e., an inverter which hardly stops operation is set as a new master machine, a stable power generation system can be provided.

In this embodiment, the inverters communicate with each other, and the reserve master machine or master machine sets the new master machine or reserve master machine. However, the present invention is not limited to this. An administration apparatus such as a personal computer may separately be prepared. The administration apparatus may execute control to collect the information of each inverter and set the new master machine or reserve master machine.

Third Embodiment

A power generation system according to the third embodiment of the present invention will be described below. The system of the third embodiment is also a solar power generation system, as in the above-described first and second embodiments. A description of the same parts as in the first and second embodiments will be omitted, and characteristic parts of this embodiment will mainly be described.

In the third embodiment, inverters which are connected in parallel communicate with each other to set the master machine and reserve master machine, as in the second embodiment. In the second embodiment, after the master machine stops, the new master machine is set. In the third embodiment, however, when the generated power of the master machine decreases, i.e., before the master machine stops, a new master machine is set.

Generally, an inverter executes MPPT control to search for the maximum power point of a solar battery module. When the output voltage from the solar battery module decreases, the inverter stops the MPPT control and executes a constant voltage operation at a predetermined voltage.

For an inverter which outputs an alternating current voltage of, e.g., 100 V, the direct current voltage input to the inverter must be at least about 160 V. When the optimum operating voltage of the solar battery is 160 V or less, the inverter does not execute the MPPT control. Instead, the inverter starts the constant voltage operation mode with priority on maintaining the output voltage and executes setting such that a predetermined solar battery voltage of 160 V is obtained.

In this embodiment, when the inverter starts this constant voltage operation mode, it is recognized that the inverter comes close to decreasing the generated power and stopping its operation at a high probability. When the master machine switches to the constant voltage operation mode, control is executed to switch the master machine.

A detailed operation of the inverter according to this embodiment will be described below.

When the solar battery module connected to the inverter set as the master machine is shaded by fallen leaves or has a failure, the output voltage from the solar battery module decreases. Simultaneously, the optimum operating voltage of the solar battery module decreases. When the optimum operating voltage is a predetermined voltage or less, the inverter switches to the constant voltage operation mode to operate the solar battery module at a constant voltage.

After the inverter switches to the constant voltage operation mode, the master machine communicates with each slave machine by using the data communication line, thereby collecting information of the generated power of each slave machine and sets an inverter having the highest generated power as a new master machine, as in the second embodiment described with reference to FIG. 6. After that, the inverter which has stopped serving as the master machine sets the master machine setting terminal of its own to Low and sets the I/O terminal of the microcomputer, which is connected to the master machine setting terminal, as a read terminal. Then, the inverter sets the master flag to 0 in the program to stop the islanding operation detection operation and operates as a slave machine.

The inverter set as a new master machine sets the I/O terminal of the microcomputer, which is connected to the master machine setting terminal, as a write terminal and sets the output of the master machine setting terminal to High. Then, the inverter sets the master flag to 1 in the program, starts the islanding operation detection operation of active schema, and starts operating as a master machine.

When not the master machine but the reserve master machine switches to the constant voltage operation mode, an inverter having the highest generated power in the slave machines may be set as a new reserve master machine.

As described above, according to this embodiment, the master machine can be switched before it stops. Hence, any state in which islanding operation detection is not executed in the system can be avoided, and a safer power generation system can be provided.

Other Embodiments

The present invention can be applied to a power generation system comprising a plurality of devices or to a management apparatus comprising a single device.

Figure 1:
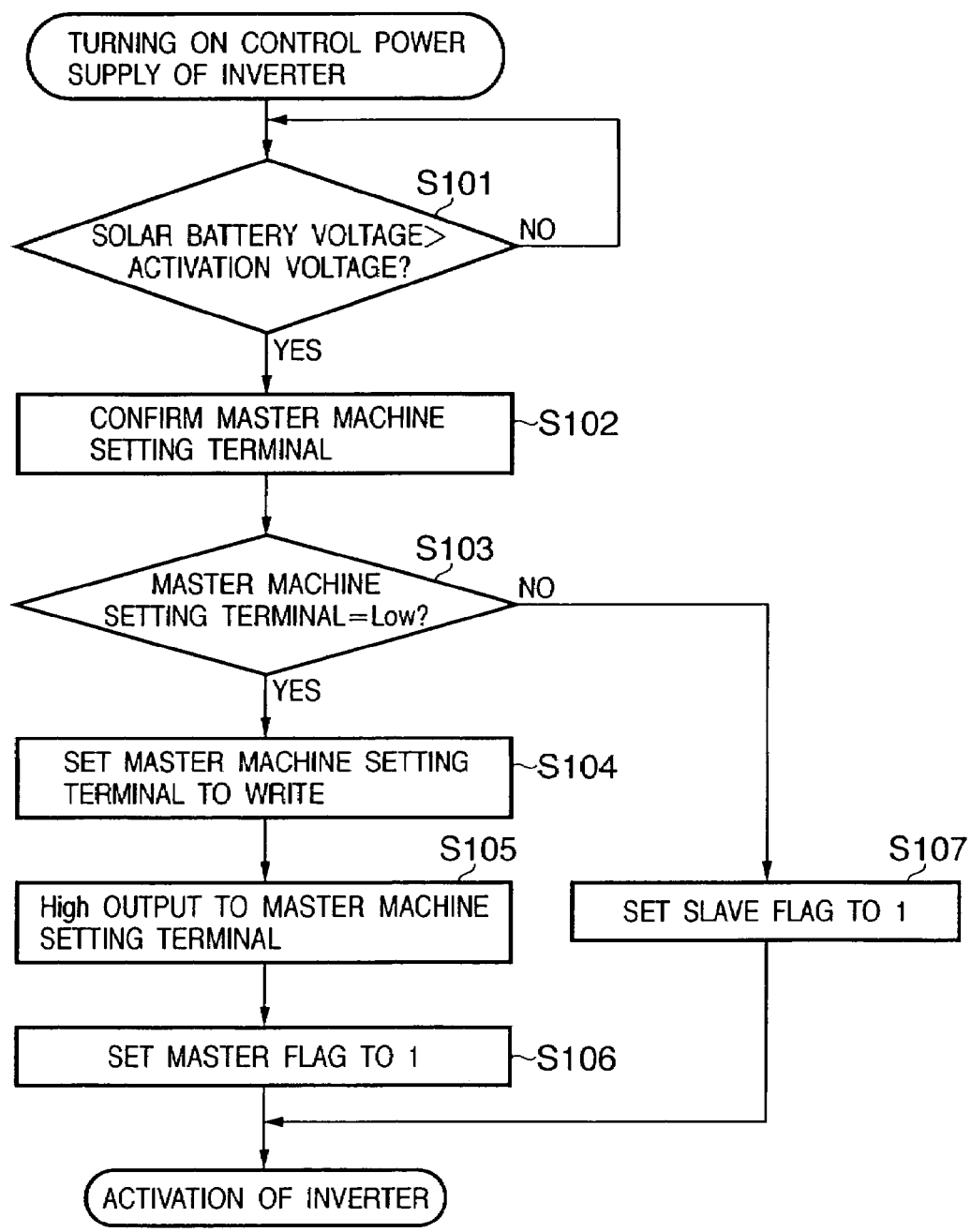
FIG. 1 is a flowchart for explaining the operation in activating each inverter according to the first embodiment of the present invention.
Figure 5:
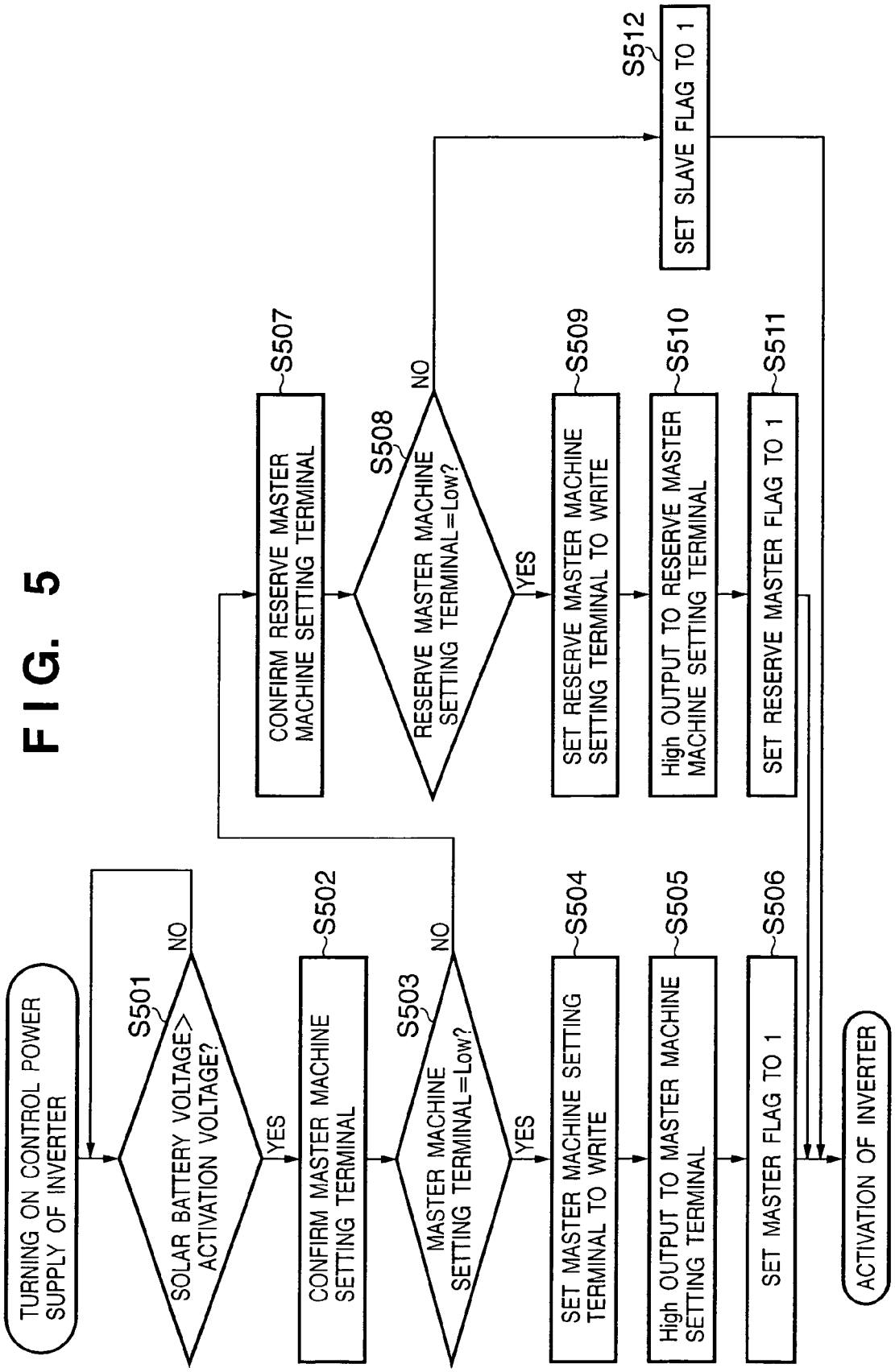
FIG. 5 is a flowchart for explaining the operation in activating the inverter according to the second embodiment of the present invention.
Figure 6:
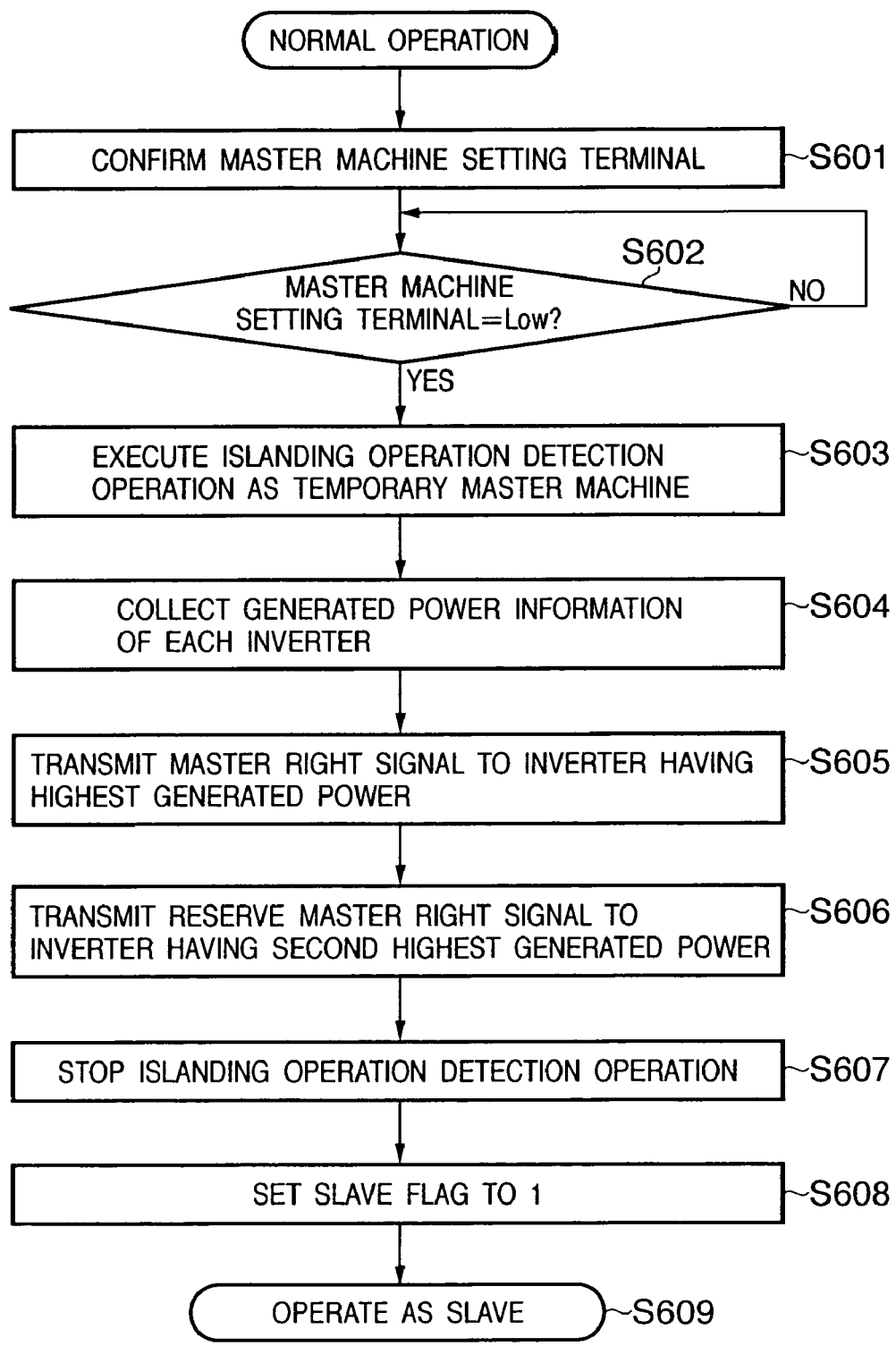
FIG. 6 is a flowchart for explaining the operation of a reserve master machine according to the second embodiment of the present invention.

Furthermore, the invention can be implemented by supplying a software program, which implements the functions of the foregoing embodiments (program codes corresponding to the above mentioned flowcharts of FIG. 1, FIG. 2 and/or FIGS. 5 to 7), directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-085237 filed on Mar. 23, 2004, which is hereby incorporated by reference herein.

What is claimed is:

1. A power generation system comprising:
a plurality of sets of direct current power sources;
power converters which are connected to the direct current power sources to convert a direct current power into an alternating current power, wherein the power converters are connected in parallel to supply the alternating current power to a system power supply; and
operation state setting means for setting, from among the power converters, a first power converter when started first as a master machine which is adapted to detect an islanding operation state in which power supply from the system power supply is stopped, and for executing setting so as to cause the remaining power converters not to detect the islanding operation state,
wherein said operation state setting means is further constructed to set, from among the power converters excluding the first power converter, a second power converter when started second as a reserve master machine, and to execute settings so as to cause the remaining power converters not to be set to the reserve master machine,
wherein when the master machine is not present among the power converters in operation or an operating mode of the master machine changes to a constant voltage operation mode, said operation state setting means is adapted to select the reserve master machine as the master machine, and
wherein when an operating mode of the reserve master machine changes to the constant voltage operation mode, said operation state setting means is adapted to change the reserve master machine to another power converter.

2. The power generation system according to claim 1, wherein each power converter comprises communication means, and the first power converter set as the master machine transmits a predetermined signal representing that the first power converter is set as the master machine to the remaining power converters by using said communication means.

3. The power generation system according to claim 1, wherein each power converter comprises said operation state setting means, and at least one of the power converters except the master machine monitors a state of the master machine.

4. The power generation system according to claim 1, wherein each power converter comprises said operation state setting means, and the master machine and reserve master machine monitor each other's states.

5. The power generation system according to claim 1, wherein the power converters have at least two operation modes including a maximum power control operation mode and a constant voltage operation mode, and said operation state setting means sets the master machine when the reserve master machine switches from the maximum power control operation mode to the constant voltage operation mode.

6. The power generation system according to claim 1, wherein the detection of the islanding operation state is done by an active schema.

7. The power generation system according to claim 1, wherein the direct current power source includes a solar battery.

8. An administration apparatus of a power generation system which includes a plurality of sets of direct current power sources and power converters which are connected to the direct current power sources to convert a direct current power into an alternating current power, the power converters being connected in parallel to supply the alternating current power to a system power supply,
wherein, from among the power converters, a first power converter when started first is set as a master machine which detects an islanding operation state in which power supply from the system power supply is stopped, and setting is executed so as to cause the remaining power converters not to detect the islanding operation state,
wherein, from among the power converters excluding the first power converter, a second power converter when started second is set as a reserve master machine, and setting is executed so as to cause the remaining power converters not to be set to the reserve master machine,
wherein when the master machine is not present among the power converters in operation or an operating mode of the master machine changes to a constant voltage operation mode, the reserve master machine is selected as the master machine, and
wherein when an operating mode of the reserve master machine changes to the constant voltage operation mode, the reserve master machine is changed to another power converter.

9. An administration method of a power generation system which includes a plurality of sets of direct current power sources and power converters which are connected to the direct current power sources to convert a direct current power into an alternating current power, the power converters being connected in parallel to supply the alternating current power to a system power supply, the method comprising:
- a first setting step of setting, from among the power converters, a first power converter when started first as a master machine which detects an islanding operation state in which power supply from the system power supply is stopped, and executing setting so as to cause the remaining power converters not to detect the islanding operation state;
- a second setting step of setting, from among the power converters excluding the first power converter, a second power converter when started second as a reserve master machine, and executing setting so as to cause the remaining power converters not to be set to the reserve master machine; and
- a selection step of, when the master machine is not present among the power converters in operation or an operation mode of the master machine changes to a constant voltage operation mode, selecting the reserve master machine as the master machine,
- wherein when an operating mode of the reserve master machine changes to the constant voltage operation mode, the reserve master machine is changed to another power converter.

10. A computer-readable storage medium which stores a computer program for implementing an administration method of a power generation system which includes a plurality of sets of direct current power sources and power converters which are connected to the direct current power sources to convert a direct current power into an alternating current power, the power converters being connected in parallel to supply the alternating current power to a system power supply, the method comprising:
- a first setting step of setting, from among the power converters, a first power converter when stated first as a master machine which detects an islanding operation state in which power supply from the system power supply is stopped, and executing setting so as to cause the remaining power converters not to detect the islanding operation state;
- a second setting step of setting, from among the power converters excluding the first power converter, a second power converter when started second as a reserve master machine, and executing setting so as to cause the remaining power converters not to be set to the reserve master machine; and
- a selection step of, when the master machine is not present among the power converters in operation or an operating mode of the master machine changes to a constant voltage operation mode, selecting the reserve master machine as the master machine,
- wherein when an operating mode of the reserve master machine changes to the constant voltage operation mode, the reserve master machine is changed to another power converter.

* * * * *